United States Patent
Su et al.

(10) Patent No.: US 12,035,348 B2
(45) Date of Patent: Jul. 9, 2024

(54) CHANNEL QUALITY REPORTING METHOD, APPARATUS, AND SYSTEM

(71) Applicant: HUAWEI TECHNOLOGIES CO., LTD., Shenzhen (CN)

(72) Inventors: Yuwan Su, Shenzhen (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 311 days.

(21) Appl. No.: 17/576,602

(22) Filed: Jan. 14, 2022

(65) Prior Publication Data

US 2022/0141828 A1    May 5, 2022

Related U.S. Application Data

(63) Continuation of application No. PCT/CN2019/096376, filed on Jul. 17, 2019.

(51) Int. Cl.

| | | |
|---|---|---|
| H04W 72/08 | (2009.01) | |
| H04L 1/00 | (2006.01) | |
| H04L 1/08 | (2006.01) | |
| H04W 72/23 | (2023.01) | |
| H04W 72/542 | (2023.01) | |

(52) U.S. Cl.
CPC ......... *H04W 72/542* (2023.01); *H04L 1/0003* (2013.01); *H04L 1/0026* (2013.01); *H04L 1/08* (2013.01); *H04W 72/23* (2023.01)

(58) Field of Classification Search
CPC .. H04W 72/542; H04W 72/23; H04L 1/0003; H04L 1/0026; H04L 1/08; H04L 1/0025; H04L 1/0028
See application file for complete search history.

(56) References Cited

U.S. PATENT DOCUMENTS

| 2016/0218788 A1 | 7/2016 | Yum et al. |
| 2016/0219600 A1* | 7/2016 | Li ........................ H04L 27/362 |

(Continued)

FOREIGN PATENT DOCUMENTS

| CN | 105493433 A | 4/2016 |
| CN | 106455091 A | 2/2017 |

(Continued)

OTHER PUBLICATIONS

3GPP TSG RAN WG1 Meeting #96bis, R1-1904569, "UL transmission in preconfigured resources for NBIoT," Lenovo, Motorola Mobility, Xi'an, China, Apr. 8-12, 2019; 5 total pages.

(Continued)

*Primary Examiner* — John D Blanton
(74) *Attorney, Agent, or Firm* — Rimon PC

(57) ABSTRACT

Embodiments provide for a channel quality reporting method, an apparatus, and a system. A terminal device determines a first index corresponding to the channel quality, and sends the first index and indication information to a network device. The first index occupies a first field, the first index is an index in an index set corresponding to a case in which a repetition number of a physical downlink control channel and/or a physical downlink data channel is a first repetition number, and the indication information indicates that the first field is occupied by an index corresponding to the first repetition number.

20 Claims, 7 Drawing Sheets

(56) References Cited

U.S. PATENT DOCUMENTS

| | | | |
|---|---|---|---|
| 2016/0262147 A1* | 9/2016 | Wei | H04L 5/0057 |
| 2017/0180102 A1 | 6/2017 | Kang et al. | |
| 2020/0163156 A1* | 5/2020 | Ye | H04W 88/06 |
| 2022/0141828 A1* | 5/2022 | Su | H04L 1/0026 |
| | | | 370/329 |

FOREIGN PATENT DOCUMENTS

| | | |
|---|---|---|
| CN | 108418659 A | 8/2018 |
| CN | 108631949 A | 10/2018 |
| CN | 108633066 A | 10/2018 |
| CN | 109429259 A | 3/2019 |
| WO | 2015030523 A1 | 3/2015 |
| WO | 2016161871 A1 | 10/2016 |
| WO | 2018175896 A1 | 9/2018 |
| WO | 2018232696 A1 | 12/2018 |

OTHER PUBLICATIONS

3GPP TSG RAN WG1 Meeting #93, R1-1807110, "Physical layer aspects of data transmission during random access procedure," Qualcomm Incorporated, Busan, Korea, May 21-25, 2018; 3 total pages.

3GPP TSG RAN WG1 Meeting #96bis, R1-1905540, "Feature lead summary of quality report in Msg3 and connected mode," Huawei, HiSilicon, Xi'an, China, Apr. 8-12, 2019; 11 total pages.

ZTE, "Support of Quality report in Msg3 for non-anchor access," 3GPP TSG RAN WG1 Meeting #95, Spokane, USA, Nov. 12-16, 2018, R1-1812777; 5 pages.

Ericsson: "Msg3 Quality Report Format for eMTC", 3GPP Draft; R2-1900560, Feb. 15, 2019, XP051601941, total 7 pages.

Huawei et al: "On support of Msg3 quality reporting for non-anchor access", 3GPP Draft; R1-1810086, Sep. 29, 2018, XP051517501, total 6 pages.

3GPP TSG RAN WG1 Meeting #95, R1-1814397, Corrections to even further enhanced MTC for LTE in 36.213, s06-s07, Motorola Mobility, Spokane, US, Nov. 12-16, 2018, total 15 pages.

* cited by examiner

CHANNEL QUALITY REPORTING METHOD, APPARATUS, AND SYSTEM

CROSS-REFERENCE TO RELATED APPLICATIONS

This application is a continuation of International Application No. PCT/CN2019/096376, filed on Jul. 17, 2019, the disclosure of which is hereby incorporated by reference in its entirety.

TECHNICAL FIELD

This application relates to the communication field, and in particular, to a channel quality reporting method, an apparatus, and a system.

BACKGROUND

In a narrowband internet of things (NB-IoT) system, a network device determines a downlink scheduling policy, but the network device, serving as a transmit end, does not know downlink channel quality. Therefore, a terminal device may measure the downlink channel quality, and report a channel quality indication (CQI) to the network device, so that the network device determines an appropriate downlink scheduling policy based on the CQI.

Conventionally, the CQI reported by the terminal device is a repetition number of a virtual narrowband physical downlink control channel (NPDCCH). The virtual NPDCCH is used for downlink channel quality measurement. A smallest value of the repetition number is 1, and a smaller repetition number indicates higher channel quality. Usually, when channel quality measured by the terminal device is average, the reported repetition number of the NPDCCH is greater than 1. In this case, the network device may properly determine a repetition number of a downlink channel and a downlink scheduling policy based on channel quality reflected by the repetition number reported by the terminal device, for example, determine the repetition number of the NPDCCH, a repetition number of a narrowband physical downlink shared channel (NPDSCH), or a modulation and coding scheme (MCS) of the NPDSCH.

However, when the channel quality measured by the terminal device is extremely good, the repetition number reported by the terminal device is still only 1. In this case, the quantity 1 of repetition cannot exactly reflect whether the channel quality is good or extremely good. Consequently, the network device cannot properly determine the downlink scheduling policy based on the repetition number.

SUMMARY

Embodiments of this application provide a channel quality reporting method, an apparatus, and a system. In this way, channel quality can be more accurately fed back. In addition, a first field occupied by a repetition number of a physical downlink control channel can be reused, to improve resource utilization. Further, backward compatibility is ensured, so that a network device understands, based on indication information, content carried in the first field, and the network device does not misunderstand the first field.

To achieve the foregoing objectives, the embodiments of this application use the following technical solutions.

According to a first aspect, a channel quality reporting method and a corresponding communication apparatus are provided. In this solution, the method includes (e.g., such as through a terminal device) determining a first index corresponding to channel quality, where the first index is an index in an index set. The index set includes a first index set and a second index set. The first index set includes a repetition number of a physical downlink control channel. The second index set is an index set corresponding to a case in which a repetition number of a physical downlink control channel is a first repetition number. The method includes sending the first index and indication information to a network device. The first index occupies a first field, and the indication information indicates that the first field is occupied by an index in the first index set or the second index set. According to this solution, because the method (e.g., for example through a terminal device) reports the first index in the index set corresponding to the first repetition number, the channel quality can be fed back more accurately than when the method reports the first repetition number, so that the network device can more properly determine a scheduling policy of a downlink transport block. In addition, because the first index occupies the first field that can be occupied by the repetition number of the physical downlink control channel, the first field occupied by the repetition number of the physical downlink control channel can be reused, thereby improving resource utilization. Further, because the indication information can indicate that the first field is occupied by the repetition number of the physical downlink control channel or the index corresponding to the first repetition number, backward compatibility is ensured, so that the network device understands, based on the indication information, content carried in the first field, and the network device does not misunderstand the first field.

In a possible design, the first index is an index of the second index set, and the second index set includes at least one of the following: a transport block size carried on the physical downlink data channel, an index of the transport block size carried on the physical downlink data channel, a modulation scheme of the data block carried on the physical downlink data channel, an index of the modulation scheme of the data block carried on the physical downlink data channel, an aggregation level of the physical downlink control channel, or an index of the aggregation level of the physical downlink control channel.

In a possible design, the first index is a first modulation and coding scheme (MCS) index, a first channel quality indication (CQI) index, a reported value corresponding to the first MCS index, or a reported value corresponding to the first CQI index.

In a possible design, the first index is the first MCS index, and that a terminal device determines a first index corresponding to channel quality includes: the terminal device determines, based on the channel quality, a preset rule, and a reference MCS index, the first MCS index corresponding to the channel quality.

In a possible design, the preset rule includes: dividing the reference MCS index by a first value, and multiplying the reference MCS index by a second value, where the first value is a positive integer, and the second value is a positive integer greater than 1.

In a possible design, the reference MCS index is an MCS index corresponding to a random access response in a random access process, or the reference MCS index is an MCS index corresponding to a message 3 (Msg 3) in the random access process.

In a possible design, that the method sends the first index and indication information to the network device includes: The method (e.g., such as through a terminal device) sends a first message to the network device, where the first message includes the first index and the indication information, and the first index occupies the first field included in the first message.

In a possible design, the first message is the message 3 (Msg 3) in the random access process.

In a possible design, the first repetition number is 1, and the index set includes a plurality of indexes.

According to a second aspect, a channel quality reporting method and a corresponding communication apparatus are provided. In this solution, the method includes (e.g., such as through a network device) receiving a first index and indication information from a terminal device, where the first index is an index in an index set. The index set includes a first index set and a second index set. The first index set includes a repetition number of a physical downlink control channel. The second index set is an index set corresponding to a case in which a repetition number of a physical downlink control channel is a first repetition number. The method (e.g., such as through a network device) determines, based on the indication information, that the first field is occupied by the first index. For a technical effect brought by the second aspect, refer to the technical effect brought by the first aspect. Details are not described herein again.

In a possible design, the first index is an index of the second set, and the second index set includes at least one of the following: a transport block size carried on the physical downlink data channel, an index of the transport block size carried on the physical downlink data channel, a modulation scheme of the data block carried on the physical downlink data channel, an index of the modulation scheme of the data block carried on the physical downlink data channel, an aggregation level of the physical downlink control channel, or an index of the aggregation level of the physical downlink control channel.

In a possible design, the first index is a first modulation and coding scheme (MCS) index, a first channel quality indication (CQI) index, a reported value corresponding to the first MCS index, or a reported value corresponding to the first CQI index.

In a possible design, that the method receives the first index and the indication information from the terminal device includes: the method (e.g., such as through a network device) receiving a first message from the terminal device, where the first message includes the first index and the indication information, and the first index occupies the first field included in the first message.

In a possible design, the first message is a message 3 (Msg 3) in a random access process.

In a possible design, the first repetition number is 1, and the index set includes a plurality of indexes.

According to a third aspect, a communication apparatus is provided, and is configured to implement the foregoing methods. The communication apparatus may be a terminal device for implementing the method described in the first aspect, an apparatus including the terminal device, or an apparatus included in the terminal device. Alternatively, the communication apparatus may be a network device for implementing method described in the second aspect, an apparatus including the network device, or an apparatus included in the network device. The communication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

According to a fourth aspect, a communication apparatus is provided. The apparatus includes a processor and a memory. The memory is configured to store computer instructions. When the processor executes the instructions, the communication apparatus is enabled to perform the method according to any one of the foregoing aspects. The communication apparatus may be a terminal device for implementing the method described in the first aspect, an apparatus including the terminal device, or an apparatus included in the terminal device. Alternatively, the communication apparatus may be a network device for implementing the method described in the second aspect, an apparatus including the network device, or an apparatus included in the network device.

According to a fifth aspect, a communication apparatus is provided. The apparatus includes a processor. The processor is configured to: be coupled to a memory, and after reading instructions in the memory, perform, according to the instructions, the method according to any one of the foregoing aspects. The communication apparatus may be a terminal device for implementing the method described in the first aspect, an apparatus including the terminal device, or an apparatus included in the terminal device. Alternatively, the communication apparatus may be a network device for implementing the method described in the second aspect, an apparatus including the network device, or an apparatus included in the network device.

According to a sixth aspect, a computer-readable storage medium is provided. The computer-readable storage medium stores instructions. When the instructions are run on a computer, the computer is enabled to perform the method according to any one of the foregoing aspects.

According to a seventh aspect, a computer program product including instructions is provided. When the computer program product runs on a computer, the computer is enabled to perform the method according to any one of the foregoing aspects.

According to an eighth aspect, a communication apparatus (for example, the communication apparatus may be a chip or a chip system) is provided. The communication apparatus includes a processor, configured to implement the function in any one of the foregoing aspects. In a possible design, the communication apparatus further includes a memory. The memory is configured to store necessary program instructions and necessary data. When the communication apparatus is a chip system, the chip system may include a chip, or may include a chip and another discrete device.

For technical effects brought by any one of the designs of the third aspect to the eighth aspect, refer to technical effects brought by different designs of the first aspect or the second aspect. Details are not described herein again.

According to a ninth aspect, a communication system is provided. The communication system includes the terminal device in the first aspect and the network device in the second aspect.

DESCRIPTION OF EMBODIMENTS

Figure 1:
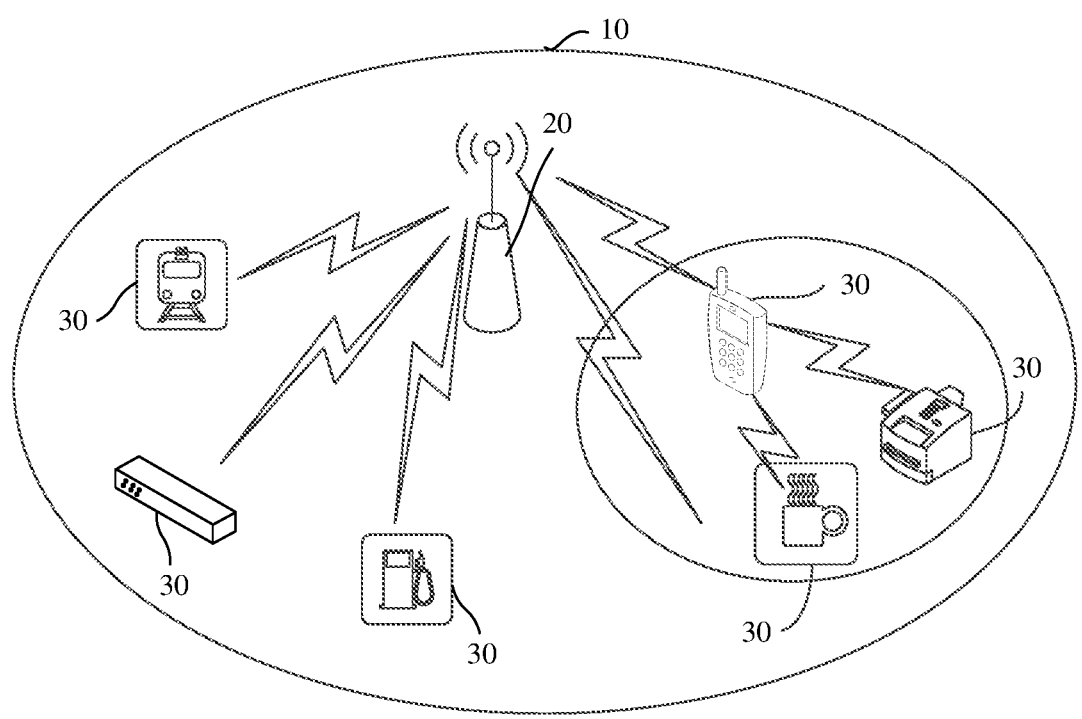
FIG. 1 is a schematic diagram of an architecture of a communication system according to an embodiment of this application.

For ease of understanding of technical solutions in embodiments of this application, the following first briefly describes technologies or nouns related to this application.

1. IoT:

The IoT is an "internet in which things are interconnected". The IoT extends user ends of the internet to any objects, so that information exchange and communication can be performed between the objects. Such communication manner is also referred to as machine type communication (MTC). A communication node is referred to as an IoT terminal or an IoT device. Typical IoT applications include an internet of vehicles, a smart community, industrial detection and monitoring, smart meter reading, a smart grid, smart agriculture, smart transportation, a smart home, environment detection, and the like.

The internet of things needs to be applied to a plurality of scenarios, for example, from an outdoor scenario to an indoor scenario, and from an overground scenario to an underground scenario. Therefore, many special requirements are imposed on designs of the internet of things. For example, an IoT terminal in some scenarios is used in an environment in which coverage is relatively poor. For example, an electric meter or a water meter is usually mounted indoors, even in a basement or other places in which wireless network signals are poor. Therefore, a coverage enhancement technology is required to resolve this problem. Alternatively, a quantity of IoT terminals in some scenarios is far greater than a quantity of devices for human-to-human communication, in other words, large-scale deployment is required. Therefore, the IoT terminal needs to be obtained and used at very low costs. Alternatively, a data packet transmitted by an IoT terminal in some scenarios is quite small, and is insensitive to a delay. Therefore, a low-rate IoT terminal needs to be supported. Alternatively, in most cases, an IoT terminal is powered by using a battery. However, in many scenarios, the IoT terminal needs to be used for more than 10 years without replacing the battery. Therefore, the IoT terminal needs to work with extremely low power consumption.

To satisfy the foregoing requirements, the 3rd generation partnership project (3GPP), a mobile communication standards organization, adopted a new research project at the RAN #62 conference to study a method for supporting the internet of things having extremely low complexity and low costs in a cellular network, and initiated the research project as an NB-IoT project at the RAN #69 conference.

2. Downlink Channel Quality Measurement:

Quality of a radio channel changes continuously. For example, a terminal device moves from an area having good channel quality to an area having poor channel quality. Alternatively, if the terminal device moves on a street with tall buildings on both sides, channel quality on the street along a signal propagation direction is improved, and channel quality on the street perpendicular to the signal propagation direction is reduced.

For downlink transmission, a network device determines a scheduling policy of a downlink transport block, but the network device, serving as a transmit end, does not know quality of a downlink channel. It is assumed that, when the quality of the downlink channel is good, the network device uses quadrature phase shift keying (QPSK) instead of a higher-order modulation scheme (for example, 16 quadrature amplitude modulation (QAM) or 64 QAM) for the downlink transport block, or the downlink transport block carried on the downlink channel is small. Consequently, spectrum utilization and a throughput are decreased. Alternatively, it is assumed that, when the channel quality is poor, the network device uses a higher-order modulation scheme instead of QPSK for the downlink transport block, or the downlink transport block carried on the downlink channel is large. Consequently, excessive retransmissions are caused, resulting in a waste of resources. In the foregoing two cases, the network device does not properly use radio resources.

Based on this, the terminal device may feedback the quality of the downlink channel, that is, measure the quality of the downlink channel and report a CQI. In an NB-IoT system, the terminal device measures the quality of the downlink channel in two periods T1 or T2. T1 is a period that is before narrowband physical random access channel (NPRACH) transmission and in which the terminal device measures narrowband reference signal received power (NRSRP) to estimate a coverage enhancement level. T2 is a period from receiving a random access response (RAR) to sending, by the terminal device, the quality of the downlink channel by using a narrowband physical uplink shared channel (NPUSCH).

Currently, the CQI reported by the terminal device is a minimum repetition number of a virtual NPDCCH that is measured by the terminal device and that meets a bit error rate of 1%. For example, a parameter of a virtual NPDCCH used for downlink channel quality measurement or reporting may be listed in Table 1.

TABLE 1

| Parameter | Value |
| --- | --- |
| Downlink control information format | Format 1 |
| Quantity of information bits | 23 bits |
| System bandwidth | 200 kHz |
| Antenna configuration | 2T1R |
| Aggregation level | 2 |
| Discontinuous reception | Disable |

The NPDCCH supports two aggregation levels: an aggregation level 1 and an aggregation level 2. The aggregation level 1 includes one narrowband control channel element (NCCE), and the aggregation level 2 includes two NCCEs, where the two NCCEs are located in a same subframe. In addition, when the NPDCCH is repeatedly transmitted (that is, a repetition number of the NPDCCH is greater than 1), only the aggregation level 2 is supported.

There are two types of CQI reporting: a type 1 (CQI-NPDCCH-NB) and a type 2 (CQI-NPDCCH-Short-NB). In the type 1, a reported value of the CQI corresponds to a repetition number of the NPDCCH. For example, a correspondence between a reported value and a repetition number of the NPDCCH may be listed in Table 2.

TABLE 2

| Reported value | The repetition number of an NPDCCH |
| --- | --- |
| noMeasurement | No measurement reporting |
| candidateRep-A | 1 |
| candidateRep-B | 2 |
| candidateRep-C | 4 |
| candidateRep-D | 8 |
| candidateRep-E | 16 |
| candidateRep-F | 32 |
| candidateRep-G | 64 |
| candidateRep-H | 128 |
| candidateRep-I | 256 |
| candidateRep-J | 512 |
| candidateRep-K | 1024 |
| candidateRep-L | 2048 |

In the type 2, a reported value of the CQI corresponds to "scaling of $R_{max}$", where $R_{max}$ is a maximum repetition number of the NPDCCH configured by a higher layer, "scaling of $R_{max}$" refers to using $R_{max}$ as a reference, and the reported value is a fractional multiple or an integer multiple of $R_{max}$. For example, a correspondence between a reported value and scaling of $R_{max}$ may be listed in Table 3.

TABLE 3

| Reported value | The repetition number of an NPDCCH |
| --- | --- |
| noMeasurement | No measurement reporting |
| candidateRep-1 | $R_{max}/8$ (NOTE 1) |
| candidateRep-2 | $R_{max}$ (NOTE 3) |
| candidateRep-3 | $4*R_{max}$ (NOTE 2) |

NOTE 1:
When $R_{max}$ is less than 8, candidateRep-1 is set to 1.
NOTE 2:
When $R_{max}$ is greater than 512, candidateRep-3 is set to 2048.
NOTE 3:
When $R_{max}$ is 1, candidateRep-2 is set to 2.

In addition, the terminal device reports the CQI by using a message 3 (Msg 3) in an NPRACH process. Whether the CQI in the Msg 3 is reported in the type 1 or the type 2 depends on a function of the Msg 3. When the Msg 3 is a radio resource control (RRC) connection resume request (RRC connection resume request), an RRC connection request, a user plane RRC connection reestablishment request, or an RRC early data request, the CQI is reported in the type 1. When the Msg 3 is a control plane RRC connection reestablishment request, the CQI is reported in the type 2.

The following describes the technical solutions in the embodiments of this application with reference to the accompanying drawings in the embodiments of this application. In descriptions of this application, "/" represents an "or" relationship between associated objects unless otherwise specified. For example, A/B may represent A or B. The term "and/or" in this application is merely an association relationship for describing associated objects, and represents that three relationships may exist. For example, A and/or B may represent the following three cases: Only A exists, both A and B exist, and only B exists, where A and B each may be singular or plural. In addition, in the descriptions of this application, "a plurality of" means two or more than two unless otherwise specified. "At least one of the following items (pieces)" or a similar expression thereof means any combination of these items, including a single item (piece) or any combination of a plurality of items (pieces). For example, at least one (piece) of a, b, or c may indicate a, b, c, a and b, a and c, b and c, or a, b, and c, where a, b, and c each may be singular or plural. In addition, to clearly describe the technical solutions in the embodiments of this application, in the embodiments of this application, terms such as "first" and "second" are used to distinguish between same items or similar items that have basically same functions and purposes. A person skilled in the art may understand that the terms such as "first" and "second" do not limit a quantity and an execution sequence, and the terms such as "first" and "second" do not indicate a definite difference. In addition, in the embodiments of this application, terms such as "example" or "for example" are used to represent giving an example, an illustration, or a description. Any embodiment or design scheme described as an "example" or with "for example" in the embodiments of this application shall not be explained as being more preferred or having more advantages than another embodiment or design scheme. Use of "example" or "for example" is intended to present a relative concept in a manner for ease of understanding.

Embodiments of this application are applicable to a long term evolution (LTE) system, for example, an NB-IoT system; or are applicable to another wireless communication system, for example, a global system for mobile communications (GSM), a universal mobile telecommunications system (UMTS), a code division multiple access (CDMA) system, a wideband code division multiple access (WCDMA) system, a 5th generation (5G) network system, or a new future-oriented network system. This is not limited to these embodiments of this application. The foregoing communication systems that are applicable to this application are merely examples for description, and communication systems that are applicable to this application are not limited thereto. This is uniformly described herein. Details are not described herein again. In addition, terms "system" and "network" may be interchanged.

FIG. 1 shows a communication system 10 according to an embodiment of this application. The communication system 10 includes a network device 20 and one or more terminal devices 30 connected to the network device 20. Optionally, different terminal devices 30 may communicate with each other.

For example, the network device 20 shown in FIG. 1 interacts with any terminal device 30. In embodiments of this application, the terminal device determines a first index corresponding to channel quality, where the first index is an index in an index set corresponding to a case in which a repetition number of a physical downlink control channel and/or a physical downlink data channel is a first repetition number. The terminal device sends the first index and indication information to the network device, where the first index occupies a first field, and the indication information indicates that the first field is occupied by an index corresponding to the first repetition number. The network device receives the first index and the indication information from the terminal device, determines, based on the indication information, that the first field is occupied by the index corresponding to the first repetition number, and determines that the index corresponding to the first repetition number is the first index, where the first field can be occupied by the repetition number of the physical downlink control channel or the index corresponding to the first repetition number, and the indication information can indicate that the first field is occupied by the repetition number of the physical downlink control channel or the index corresponding to the first repetition number. An implementation of this solution is described in detail in a subsequent method embodiments. Details are not described herein. According to this solution, because the terminal device reports the first index in the index set corresponding to the first repetition number, the channel quality can be fed back more accurately than when the terminal device reports the first repetition number, so that the network device can more properly determine a scheduling policy of a downlink transport block. In addition, because the first index occupies the first field that can be occupied by the repetition number of the physical downlink control channel, the first field occupied by the repetition number of the physical downlink control channel can be reused, to improve resource utilization. Further, because the indication information can indicate that the first field is occupied by the repetition number of the physical downlink control channel or the index corresponding to the first repetition number, backward compatibility is ensured, so that the network device understands, based on the indication information, content carried in the first field, and the network device does not misunderstand the first field.

Optionally, the network device 20 in embodiments of this application is a device for connecting the terminal devices 30 to a wireless network, and may be an evolved NodeB (eNB or eNodeB) in LTE, a base transceiver station (BTS) in GSM or CDMA, a NodeB in a WCDMA system, a base station in a 5G network or a future evolved public land mobile network (PLMN), a broadband network gateway (BNG), an aggregation switch, a non-3rd generation partnership project (3GPP) access device, or the like. This is not limited to embodiments of this application. Optionally, the base station in embodiments of this application may include base stations in various forms, for example, a macro base station, a micro base station (which is also referred to as a small cell), a relay station, and an access point. This is not limited in embodiments of this application.

Optionally, the terminal device 30 in embodiments of this application may be a device configured to implement a wireless communication function, for example, a terminal or a chip that can be used in the terminal. The terminal may be user equipment (UE), an access terminal, a terminal unit, a terminal station, a mobile station, a remote station, a remote terminal, a mobile device, a wireless communication device, a terminal agent, a terminal apparatus, or the like in an LTE network or a future evolved PLMN. The access terminal may be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

Optionally, the network device 20 and the terminal device 30 in embodiments of this application may also be referred to as communication apparatuses, and each may be a general-purpose device or a dedicated device. This is not limited to these embodiments of this application.

Figure 2:
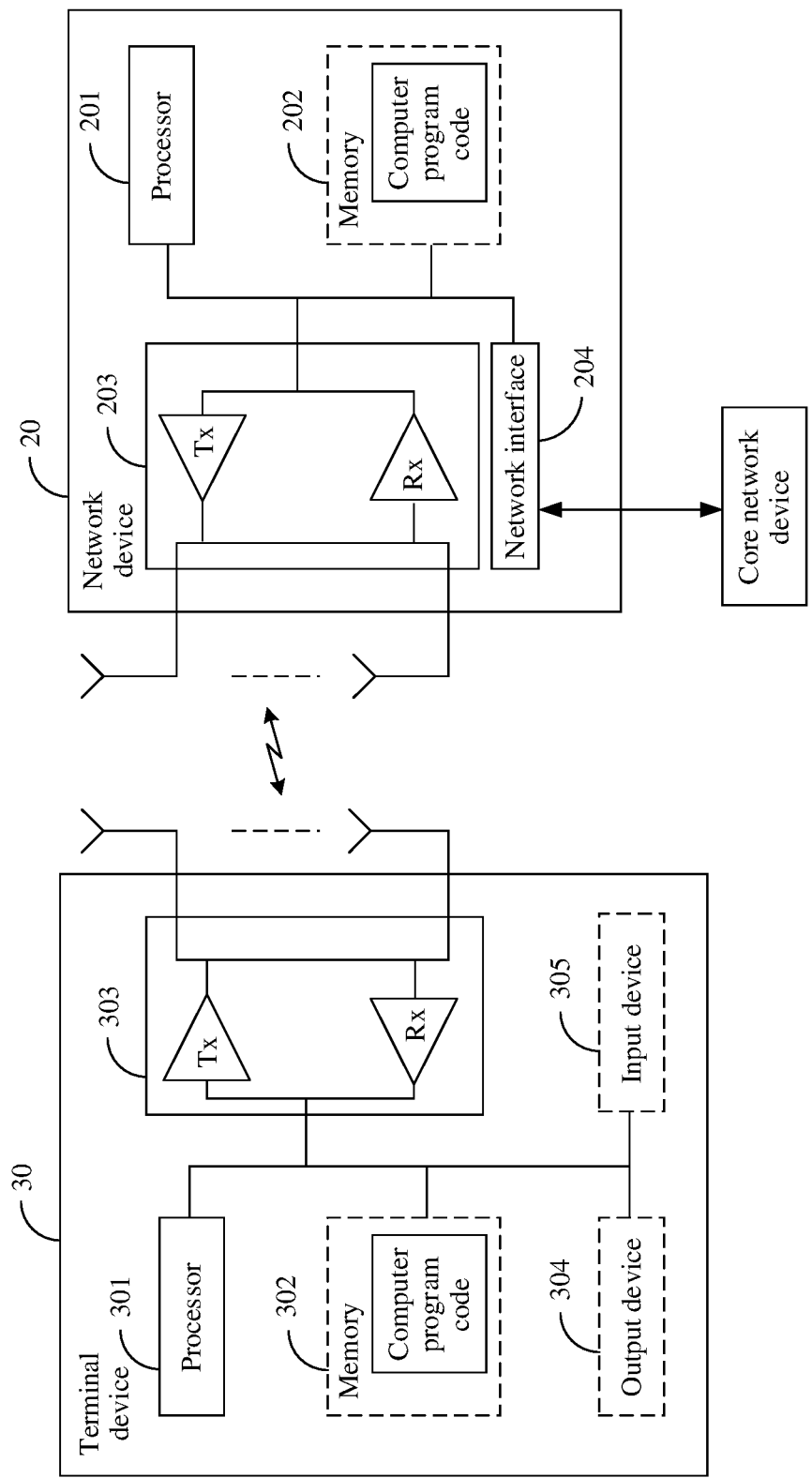
FIG. 2 is a schematic diagram of a structure of a terminal device and a structure of a network device according to an embodiment of this application.

Optionally, FIG. 2 is a schematic diagram of a structure of a network device 20 and a structure of a terminal device 30 according to an embodiment of this application.

The terminal device 30 includes at least one processor (an example in which the terminal device 30 includes one processor 301 is used for description in FIG. 2) and at least one transceiver (an example in which the terminal device 30 includes one transceiver 303 is used for description in FIG. 2). Optionally, the terminal device 30 may further include at least one memory (an example in which the terminal device 30 includes one memory 302 is used for description in FIG. 2), at least one output device (an example in which the terminal device 30 includes one output device 304 is used for description in FIG. 2), and at least one input device (an example in which the terminal device 30 includes one input device 305 is used for description in FIG. 2).

The processor 301, the memory 302, and the transceiver 303 are connected through a communication line. The communication line may include a path for transmitting information between the foregoing components.

The processor 301 may be a general-purpose central processing unit (CPU), a microprocessor, an application-specific integrated circuit (ASIC), or one or more integrated circuits configured to control program execution of the solutions in this application. During implementation, in an embodiment, the processor 301 may also include a plurality of CPUs, and the processor 301 may be a single-core (single-CPU) processor or a multi-core (multi-CPU) processor. The processor herein may refer to one or more devices, circuits, or processing cores configured to process data (for example, computer program instructions).

The memory 302 may be an apparatus having a storage function. For example, the memory 302 may be a read-only memory (ROM), another type of static storage device capable of storing static information and instructions, a random access memory (RAM), or another type of dynamic storage device capable of storing information and instructions, or may be an electrically erasable programmable read-only memory (EEPROM), a compact disc read-only memory (CD-ROM), another compact disc storage, an optical disc storage (including a compact disc, a laser disc, an optical disc, a digital versatile disc, a Blu-ray disc, and the like), a magnetic disk storage medium, another magnetic storage device, or any other medium capable of including or storing expected program code in a form of instructions or a data structure and capable of being accessed by a computer. However, the memory 302 is not limited thereto. The memory 302 may exist independently, and is connected to the processor 301 through the communication line. The memory 302 may alternatively be integrated with the processor 301.

The memory 302 is configured to store computer-executable instructions for executing the solutions of this application, and the processor 301 controls the execution. The processor 301 is configured to execute the computer-executable instructions stored in the memory 302, to implement the channel quality reporting method according to the embodiments of this application.

Alternatively, optionally, in embodiments of this application, the processor 301 may execute processing related functions in the channel quality reporting method provided in the following embodiments of this application, and the transceiver 303 is responsible for communication with another device or a communication network. This is not limited to these embodiments of this application.

Optionally, the computer-executable instructions in embodiments of this application may also be referred to as application program code or computer program code. This is not limited to these embodiments of this application.

The transceiver 303 may use any apparatus such as a transceiver, and is configured to communicate with another device or a communication network, for example, the Ethernet, a radio access network (RAN), or a wireless local area network (WLAN). The transceiver 303 includes a transmitter (Tx) and a receiver (Rx).

The output device 304 communicates with the processor 301, and may display information in various manners. For example, the output device 304 may be a liquid crystal display (LCD), a light emitting diode (LED) display device, a cathode ray tube (CRT) display device, or a projector.

The input device 305 communicates with the processor 301, and may receive an input of a user in various manners. For example, the input device 305 may be a mouse, a keyboard, a touchscreen device, or a sensing device.

The network device 20 includes at least one processor (an example in which the network device 20 includes one processor 201 is used for description in FIG. 2), at least one transceiver (an example in which the network device 20 includes one transceiver 203 is used for description in FIG. 2), and at least one network interface (an example in which the network device 20 includes one network interface 204 is used for description in FIG. 2). Optionally, the network device 20 may further include at least one memory (an example in which the network device 20 includes one memory 202 is used for description in FIG. 2). The processor 201, the memory 202, the transceiver 203, and the network interface 204 are connected through a communication line. The network interface 204 is configured to: connect to a core network device through a link (for example, an Si interface), or connect to a network interface of another network device through a wired or wireless link (for example, an X2 interface) (not shown in FIG. 2). This is not limited to these embodiments of this application. In addition, for related descriptions of the processor 201, the memory 202, and the transceiver 203, refer to descriptions of the processor 301, the memory 302, and the transceiver 303 in the terminal device 30. Details are not described herein again.

Figure 3:
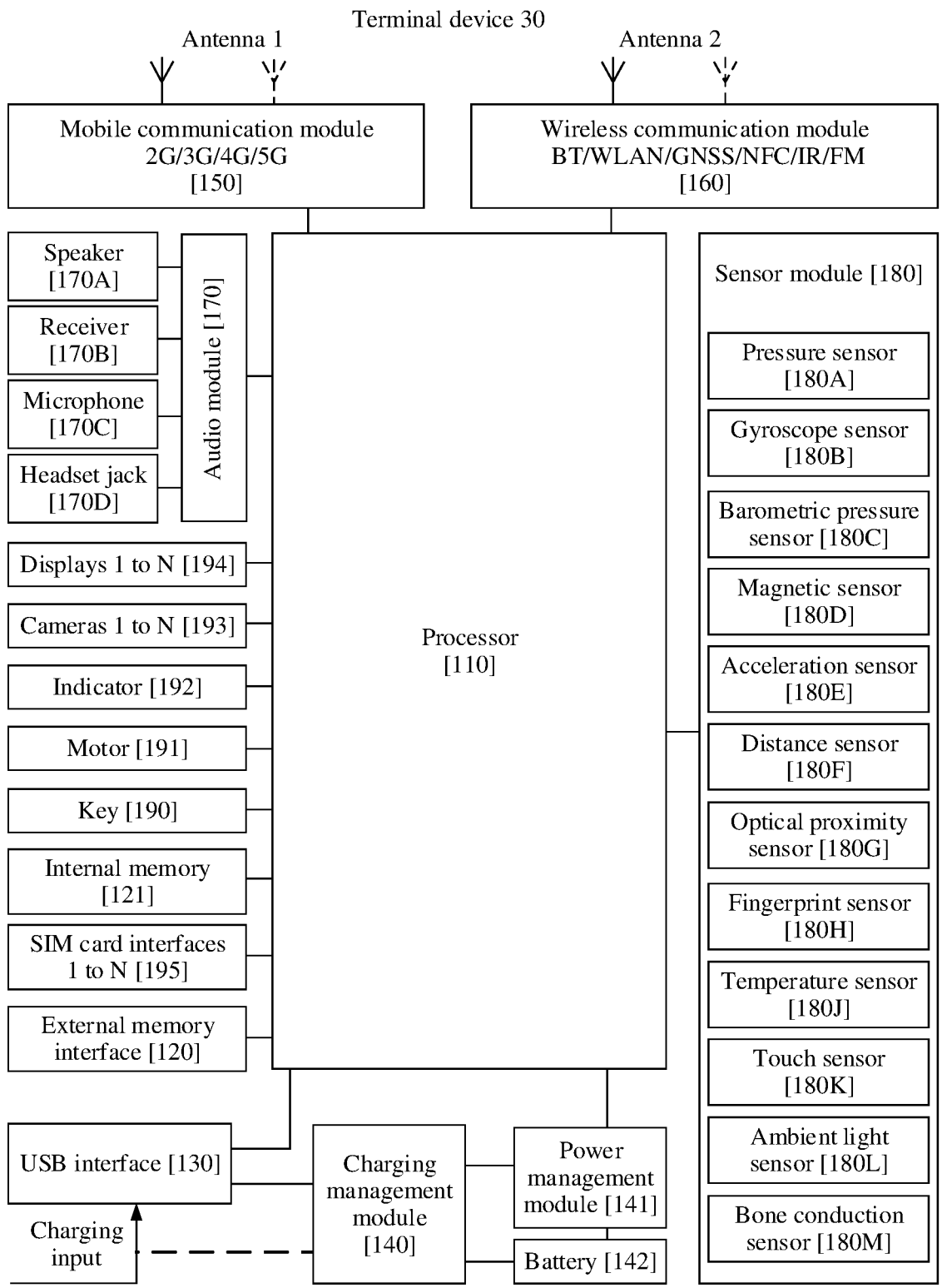
FIG. 3 is a schematic diagram of another structure of a terminal device according to an embodiment of this application.

With reference to the schematic diagram of the structure of the terminal device 30 shown in FIG. 2, for example, FIG. 3 shows a form of the structure of the terminal device 30 according to an embodiment of this application.

In some embodiments, a function of the processor 301 in FIG. 2 may be implemented by a processor 110 in FIG. 3.

In some embodiments, a function of the transceiver 303 in FIG. 2 may be implemented through an antenna 1, an antenna 2, a mobile communication module 150, a wireless communication module 160, and the like in FIG. 3.

The antenna 1 (e.g., a first antenna) and the antenna 2 (e.g., a second antenna) are configured to transmit and receive an electromagnetic wave signal. Each antenna in the terminal device 30 may be configured to cover one or more communication frequency bands. Different antennas may further be multiplexed, to improve antenna utilization. For example, the antenna 1 may be multiplexed as a diversity antenna of a wireless local area network. In some other embodiments, an antenna may be used in combination with a tuning switch.

The mobile communication module 150 may provide a solution that is applied to the terminal device 30 and that is used for wireless communication including 2G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the processed electromagnetic wave to a modem processor for demodulation. The mobile communication module 150 may further amplify a signal modulated by the modem processor, and convert the signal into an electromagnetic wave through the antenna 1 for radiation. In some embodiments, at least some functional modules of the mobile communication module 150 may be disposed in the processor 110. In some embodiments, at least some functional modules of the mobile communication module 150 and at least some modules of the processor 110 may be disposed in a same device.

The wireless communication module 160 may provide a solution that is applied to the terminal device 30 and that is used for wireless communication including a wireless local area network (WLAN) (for example, a Wi-Fi network), Bluetooth (blue tooth, BT), a global navigation satellite system (GNSS), frequency modulation (FM), near field communication (NFC), an infrared (IR) technology, and the like. The wireless communication module 160 may be one or more devices that integrate at least one communication processing module. The wireless communication module 160 receives an electromagnetic wave through the antenna 2, performs frequency modulation and filtering processing on an electromagnetic wave signal, and sends the processed signal to the processor 110. The wireless communication module 160 may further receive a to-be-sent signal from the processor 110, perform frequency modulation and amplification on the signal, and convert the signal into an electromagnetic wave through the antenna 2 for radiation. When the terminal device 30 is a first device, that the wireless communication module 160 may provide an NFC wireless communication solution applied to the terminal device 30 means that the first device includes an NFC chip. The NFC chip can improve an NFC wireless communication function. When the terminal device 30 is a second device, that the wireless communication module 160 may provide an NFC wireless communication solution applied to the terminal device 30 means that the first device includes an electronic label (for example, a radio frequency identification (RFID) label). If an NFC chip of another device is close to the electronic label, the another device may perform NFC wireless communication with the second device.

In some embodiments, the antenna 1 of the terminal device 30 is coupled to the mobile communication module 150, and the antenna 2 is coupled to the wireless communication module 160, so that the terminal device 30 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and the like. The GNSS may include a global positioning system (GPS), a global navigation satellite system (GLONASS), a beidou navigation satellite system (BDS), a quasi-zenith satellite system (QZSS), or a satellite based augmentation system (SBAS).

In some embodiments, a function of the memory 302 in FIG. 2 may be implemented by an internal memory 121 in FIG. 3, an external memory (for example, a micro SD card) connected to an external memory interface 120, or the like.

In some embodiments, a function of the output device 304 in FIG. 2 may be implemented by a display 194 in FIG. 3. The display 194 is configured to display an image, a video, and the like. The display 194 includes a display panel.

In some embodiments, a function of the input device 305 in FIG. 2 may be implemented by a mouse, a keyboard, a touchscreen device, or a sensor module 180 in FIG. 3. For example, as shown in FIG. 3, the sensor module 180 may include, for example, one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, and a bone conduction sensor 180M. This is not limited to these embodiments of this application.

In some embodiments, as shown in FIG. 3, the terminal device 30 may further include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (which is also referred to as a "horn"), a receiver 170B (which is also referred to as an "earpiece"), a microphone 170C (which is also referred to as a "mike" or a "microphone"), a headset jack 170D, or the like. This is not limited to these embodiments of this application.

It may be understood that the structure shown in FIG. 3 does not constitute a limitation on the terminal device 30. For example, in some other embodiments of this application, the terminal device 30 may include more or fewer components than those shown in the figure, or combine some components, or split some components, or have different component arrangements. The components shown in the figure may be implemented by hardware, software, or a combination of software and hardware.

With reference to FIG. 1 through FIG. 3, the following describes in detail the channel quality reporting method provided in the embodiments of this application by using an example in which the network device 20 interacts with any terminal device 30 in FIG. 1.

It should be noted that, in the following embodiments of this application, names of messages between network elements, names of parameters in the messages, or the like are merely examples, and there may be other names during implementation. This is not limited in the embodiments of this application.

Figure 4:
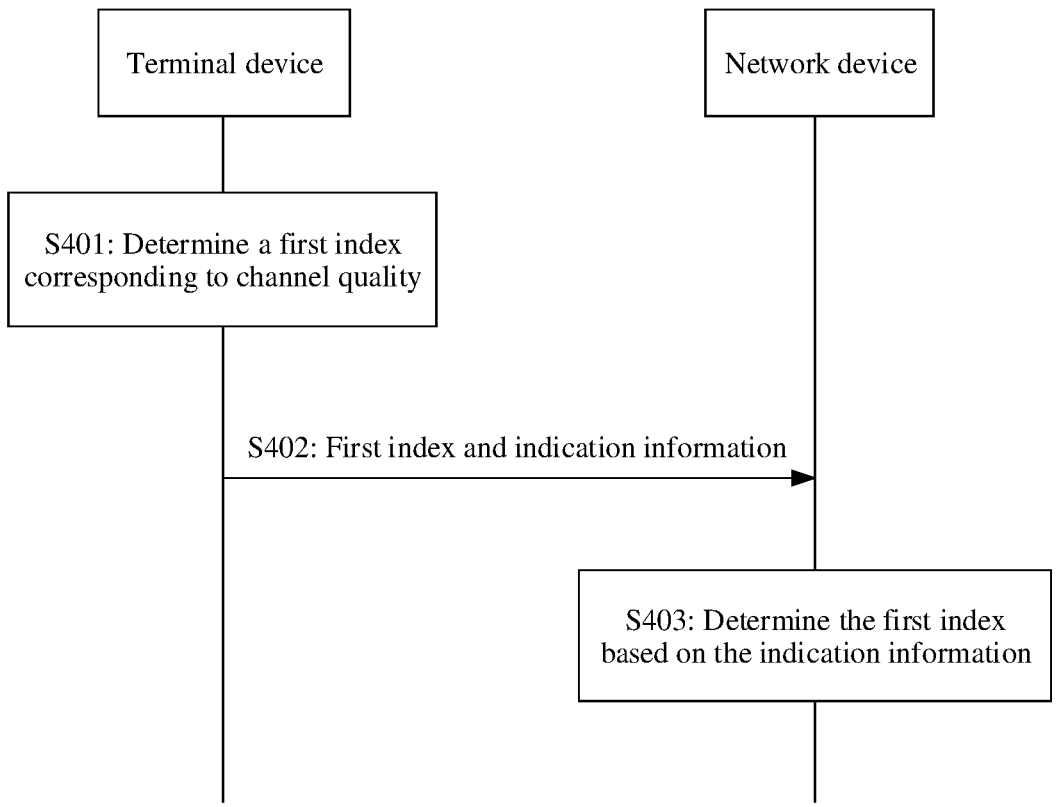
FIG. 4 is a first schematic flowchart of a channel quality reporting method according to an embodiment of this application.

It should be noted that, in this application, a physical downlink control channel (PDCCH) may be an NPDCCH, and a physical downlink shared channel (PDSCH) may be a physical downlink data channel or an NPDSCH. The NPDCCH may be a virtual NPDCCH, or may be an NPDCCH sent by the network device. The physical downlink data channel may be a virtual physical downlink data channel, or may be a physical downlink data channel sent by the network device. The NPDSCH may be a virtual NPDSCH, or may be an NPDSCH sent by the network device. This is uniformly described herein. Details are not described again in the following embodiments. FIG. 4 shows a channel quality reporting method according to an embodiment of this application. The channel quality reporting method includes the following steps.

S401: A terminal device determines a first index corresponding to channel quality.

The first index is an index in an index set corresponding to a case in which a repetition number of a PDCCH and/or a PDSCH is a first repetition number. The first index can more accurately reflect channel quality of the PDCCH and/or the PDSCH measured by the terminal device. It may also be understood that the first index can more accurately reflect a data demodulation capability of the terminal device under the measured channel quality.

Optionally, the first index may be a first MCS index, a reported value corresponding to the first MCS index, a first CQI index, or a reported value corresponding to the first CQI index.

Optionally, the terminal device may measure the channel quality of the PDCCH and/or the PDSCH. When determining, based on the measured channel quality, that the repetition number of the PDCCH and/or the PDSCH is the first repetition number, the terminal device may determine, in the following two manners, the first index corresponding to the measured channel quality.

Manner 1: When determining that the repetition number of the PDCCH and/or the PDSCH is the first repetition number, the terminal device further determines, based on the measured channel quality, the first index from the index set corresponding to the first repetition number.

Manner 2: When determining that the repetition number of the PDCCH and/or the PDSCH is the first repetition number, the terminal device determines the first MCS index based on the measured channel quality, a preset rule, and a reference MCS index. It should be noted that the first index determined by the terminal device in the manner 2 is the first MCS index.

Optionally, the reference MCS index may be an MCS index, corresponding to an RAR, indicated in downlink control information (DCI) that is sent by a network device for scheduling the RAR, where a format of the DCI may be a format 1. Alternatively, the reference MCS index may be an MCS index that corresponds to a Msg 3 and that is indicated in scheduling information, in the RAR, used to schedule the Msg 3.

Optionally, the manner 2 may include: The terminal device determines a target MCS index based on the measured channel quality, where the target MCS index is an index in the index set corresponding to the first repetition number. The target MCS index can more accurately reflect the measured channel quality of the PDCCH and/or the PDSCH. In addition, the terminal device scales the reference MCS index according to the preset rule, to obtain a candidate index set, and then determines a candidate index in the candidate index set closest to the target MCS index as the first index, where the candidate index set is included in the index set corresponding to the first repetition number, and the candidate index closest to the target MCS index may be a candidate index that is closest to the target MCS index and that is greater than the target MCS index, or may be a candidate index that is closest to the target MCS index and that is less than the target MCS index.

Optionally, the preset rule may include: dividing the reference MCS index by a first value, and multiplying the reference MCS index by a second value, where the first value includes one or more positive integers, the second value includes one or more positive integers greater than 1, and the first value may be the same as or different from the second value. When the reference MCS index cannot be exactly divided by the first value, a result of dividing the reference MCS index by the first value is [reference MCS index/first value], where [ ] indicates rounding down.

For example, the first value includes 1 and M1, and the second value includes M2. The preset rule and a candidate index obtained after the reference MCS index is scaled according to the preset rule may be shown in Table 4.

TABLE 4

| Preset rule | Candidate index |
| --- | --- |
| Dividing a reference MCS index by M1 | Reference MCS index/M1 (NOTE 1) |
| Reference MCS index | Reference MCS index (NOTE 2) |
| Multiplying M2 by a reference MCS index | M2*Reference MCS index (NOTE 3) |

It is assumed that, in the index set corresponding to the first repetition number, a largest index is X1 and a smallest index is X2. In this case, when the terminal device performs scaling processing on the reference MCS index according to Table 4, NOTE 1 includes: If the reference MCS index is less than X2*M1, a candidate index obtained by dividing the reference MCS index by M1 is set to X2; NOTE 3 includes: If the reference MCS index is greater than X1/M2, a candidate index obtained by multiplying the reference MCS index by M2 is set to X1; and NOTE 2 includes: If the reference MCS index is equal to X2, a candidate index is set to X2+1.

For example, based on Table 4, it is assumed that a value of X1 is 13, a value of X2 is 0, a value of M1 is 2, a value of M2 is 3, the reference MCS index is 2, and the target MCS index determined by the terminal device based on the measured channel quality is 5. In this case, the candidate index obtained after the terminal device scales the reference MCS index according to the preset rule is shown in Table 5. The candidate index set includes {1, 2, 6}. Because in the candidate index set, a candidate index that is closest to the target MCS index 5 and that is greater than the target MCS index is 6, the first index may be 6. Alternatively, because in the candidate index set, a candidate index that is closest to the target MCS index 5 and that is less than the target MCS index is 2, the first index may be 2.

TABLE 5

| Preset rule | Candidate index |
| --- | --- |
| Dividing a reference MCS index by 2 | 1 |
| Reference MCS index | 2 |
| Multiplying 3 by a reference MCS index | 6 |

Alternatively, for example, based on Table 4, it is assumed that a value of X1 is 13, a value of X2 is 0, a value of M1 is 2, a value of M2 is 3, the reference MCS index is 5, and the target MCS index determined by the terminal device based on the measured channel quality is 10. In this case, the candidate index obtained after the terminal device scales the reference MCS index according to the preset rule is shown in Table 6. Because the reference MCS index is greater than X1/M2, that is, 5 is greater than 13/3, according to NOTE 3, the candidate index is set to 13 when the reference MCS index is multiplied by 3. In this way, the candidate index set includes {2, 5, 13}. Because in the candidate index set, a candidate index that is closest to the target MCS index 10 and that is greater than the target MCS index is 13, the first index may be 13. Alternatively, because in the candidate index set, a candidate index that is closest to the target MCS index 10 and that is less than the target MCS index is 5, the first index may be 5.

TABLE 6

| Preset rule | Candidate index |
| --- | --- |
| Dividing a reference MCS index by 2 | 2 |
| Reference MCS index | 5 |
| Multiplying 3 by a reference MCS index | 13 |

Optionally, as shown in Table 7, each preset rule may further correspond to one reported value. In this case, after determining the first MCS index, the terminal device may further determine, according to the preset rule corresponding to the first MCS index, the reported value corresponding to the first MCS index. That is, the first index may alternatively be the reported value corresponding to the first MCS index. For example, based on Table 5, if a correspondence between a preset rule and a reported value is shown in Table 8, a reported value corresponding to a first MCS index 6 is candidate MCS-3, or a reported value corresponding to a first MCS index 2 is candidate MCS-2.

TABLE 7

| Reported value | Preset rule |
| --- | --- |
| candidateMCS-1 | Dividing a reference MCS index by M1 |
| candidateMCS-2 | Reference MCS index |
| candidateMCS-3 | Multiplying M2 by a reference MCS index |

TABLE 8

| Reported value | Preset rule | Candidate index |
| --- | --- | --- |
| candidateMCS-1 | Dividing a reference MCS index by 2 | 1 |
| candidateMCS-2 | Reference MCS index | 2 |
| candidateMCS-3 | Multiplying 3 by a reference MCS index | 6 |

In the descriptions of Table 4 to Table 8, the preset rule is described by using an example in which the first value includes 1 and M1 and the second value includes M2. It may be understood that the first value and the second value each may further include one or more other values. This is not limited to these embodiments of this application. For example, as shown in the following Table 9, the first value may include 1 and M1, and the second value may include M2 and M3, where a value of M3 is different from a value of M2. Alternatively, as shown in the following Table 10, the first value may include 1, M1, and M4, and the second value may include M2 and M3, where a value of M1 is different from a value of M4, and a value of M3 is different from a value of M2.

TABLE 9

| Preset rule |
| --- |
| Dividing a reference MCS index by M1 |
| Reference MCS index |
| Multiplying M2 by a reference MCS index |
| Multiplying M3 by a reference MCS index |

TABLE 10

| Preset rule |
| --- |
| Dividing a reference MCS index by M1 |
| Dividing a reference MCS index by M4 |
| Reference MCS index |
| Multiplying M2 by a reference MCS index |
| Multiplying M3 by a reference MCS index |

In the foregoing embodiments, an example in which the terminal device determines the first repetition number, and then determines the first index is used for description. It may be understood that, after measuring the channel quality, the terminal device may alternatively determine the first repetition number and the first index at the same time, or may determine the first index and then determine the first repetition number, and establish a correspondence between the first repetition number and the first index. This is not limited to these embodiments of this application.

Optionally, the first index determined by the terminal device may be used to indicate one or more of the following: a transport block size (TBS) carried on the PDSCH, an index of the transport block size carried on the PDSCH, a modulation scheme of the data block carried on the PDSCH, an index of the modulation scheme of the data block carried on the PDSCH, an aggregation level of the PDCCH, an index of the aggregation level of the PDCCH, the repetition number of the PDCCH, an index of the repetition number of the PDCCH, the repetition number of the PDSCH, or an index of the repetition number of the PDSCH.

Optionally, when the first index indicates the index of the transport block size carried on the PDSCH, if the terminal device determines the first index in the foregoing manner 1, because there are a total of 14 existing TBS indexes, the first index may have 14 values. In this case, if the first index is the first MCS index or the reported value corresponding to the first MCS index, a value of the first MCS index and the reported value corresponding to the first MCS index may be shown in Table 11.

TABLE 11

| Reported value | First MCS index |
| --- | --- |
| candidateMCS-A | 0 |
| candidateMCS-B | 1 |
| candidateMCS-C | 2 |
| candidateMCS-D | 3 |
| candidateMCS-E | 4 |
| candidateMCS-F | 5 |
| candidateMCS-G | 6 |
| candidateMCS-H | 7 |
| candidateMCS-I | 8 |
| candidateMCS-J | 9 |
| candidateMCS-K | 10 |
| candidateMCS-L | 11 |
| candidateMCS-M | 12 |
| candidateMCS-N | 13 |

In addition, for example, when the first MCS index is shown in Table 11, in a possible implementation, the index that is indicated by the first MCS index and that is of the transport block size carried on the PDSCH may be shown in Table 12. In this case, it may be considered that the transport block size carried on the PDSCH is the same as the first MCS index.

TABLE 12

| First MCS index | TBS index |
| --- | --- |
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |

It may be understood that, the TBS index indicated by the first MCS index in Table 12 is merely an example description to these embodiments of this application. In actual application, the TBS index indicated by the first MCS index in Table 12 may alternatively have another value. This is not limited to these embodiments of this application.

Alternatively, optionally, when the first index indicates the index of the transport block size carried on the PDSCH and the modulation scheme of the data block carried on the PDSCH, if the terminal device determines the first index in the foregoing manner 1, and the first index is the first MCS index or the reported value corresponding to the first MCS index, a value of the first MCS index and the reported value corresponding to the first MCS index may be shown in Table 13.

TABLE 13

| Reported value | First MCS index |
| --- | --- |
| candidateMCS-A | 0 |
| candidateMCS-B | 1 |
| candidateMCS-C | 2 |
| candidateMCS-D | 3 |
| candidateMCS-E | 4 |
| candidateMCS-F | 5 |
| candidateMCS-G | 6 |
| candidateMCS-H | 7 |
| candidateMCS-I | 8 |
| candidateMCS-J | 9 |
| candidateMCS-K | 10 |
| candidateMCS-L | 11 |
| candidateMCS-M | 12 |
| candidateMCS-N | 13 |
| candidateMCS-P | 14 |
| candidateMCS-Q | 15 |

In addition, for example, when the first MCS index is shown in Table 13, in a possible implementation, the index of the transport block size carried on the PDSCH and the modulation scheme of the data block carried on the PDSCH that are indicated by the first MCS index may be shown in Table 14.

TABLE 14

| First MCS index | Modulation scheme | TBS index |
| --- | --- | --- |
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |

TABLE 14-continued

| First MCS index | Modulation scheme | TBS index |
|---|---|---|
| 6 | QPSK | 6 |
| 7 | QPSK | 7 |
| 8 | QPSK | 8 |
| 9 | QPSK | 9 |
| 10 | QPSK | 10 |
| 11 | QPSK | 11 |
| 12 | QPSK | 12 |
| 13 | QPSK | 13 |
| 14 | 16 QAM | 13 |
| 15 | 64 QAM | 13 |

It may be understood that, the modulation scheme and the TBS index that are indicated by the first MCS index in Table 14 is merely an example description to these embodiments of this application. In actual application, there may alternatively be another combination of the modulation scheme and the TBS index that are indicated by the first MCS index in Table 14. This is not limited to these embodiments of this application.

Alternatively, optionally, when the first index indicates the index of the transport block size carried on the PDSCH, the modulation scheme of the data block carried on the PDSCH, and the aggregation level of the PDCCH, if the terminal device determines the first index in the foregoing manner 1, and the first index is the first MCS index or the reported value corresponding to the first MCS index, for example, the first MCS index is shown in Table 13, in a possible implementation, the index of the transport block size carried on the PDSCH, the modulation scheme of the data block carried on the PDSCH, and the aggregation level of the PDCCH that are indicated by the first index may be shown in Table 15.

TABLE 15

| First MCS index | Modulation scheme | TBS index | Aggregation level of a PDCCH |
|---|---|---|---|
| 0 | QPSK | 0 | 1 |
| 1 | QPSK | 1 | 1 |
| 2 | QPSK | 2 | 1 |
| 3 | QPSK | 3 | 1 |
| 4 | QPSK | 4 | 1 |
| 5 | QPSK | 5 | 1 |
| 6 | QPSK | 6 | 1 |
| 7 | QPSK | 7 | 1 |
| 8 | QPSK | 8 | 2 |
| 9 | QPSK | 9 | 2 |
| 10 | QPSK | 10 | 2 |
| 11 | QPSK | 11 | 2 |
| 12 | QPSK | 12 | 2 |
| 13 | QPSK | 13 | 2 |
| 14 | 16 QAM | 13 | 2 |
| 15 | 64 QAM | 13 | 2 |

It should be noted that the example in Table 15 is applicable to a case in which the first repetition number is 1. When the repetition number is greater than 1, the aggregation level of the PDCCH indicated by the first MCS index is 2.

Alternatively, when the first index indicates the index of the transport block size carried on the PDSCH, the modulation scheme of the data block carried on the PDSCH, and the repetition number of the PDSCH, if the terminal device determines the first index in the foregoing manner 1, and the first index is the first MCS index or the reported value corresponding to the first MCS index, for example, the first MCS index is shown in Table 13, in a possible implementation, the index of the transport block size carried on the PDSCH, the modulation scheme of the data block carried on the PDSCH, and the repetition number of the PDSCH that are indicated by the first index may be shown in Table 16.

TABLE 16

| First MCS index | Modulation scheme | TBS index | The repetition number of a PDSCH |
|---|---|---|---|
| 0 | QPSK | 0 | First repetition number |
| 1 | QPSK | 1 | First repetition number |
| 2 | QPSK | 2 | First repetition number |
| 3 | QPSK | 3 | First repetition number |
| 4 | QPSK | 4 | First repetition number |
| 5 | QPSK | 5 | First repetition number |
| 6 | QPSK | 6 | First repetition number |
| 7 | QPSK | 7 | First repetition number |
| 8 | QPSK | 8 | First repetition number |
| 9 | QPSK | 9 | First repetition number |
| 10 | QPSK | 10 | First repetition number |
| 11 | QPSK | 11 | First repetition number |
| 12 | QPSK | 12 | First repetition number |
| 13 | QPSK | 13 | First repetition number |
| 14 | 16 QAM | 13 | First repetition number |
| 15 | 64 QAM | 13 | First repetition number |

It should be noted that, in the foregoing example, only an example in which the first index indicates some parameters is used for description. When the first index is used to indicate another parameter or a combination of other parameters, the another parameter or the combination of other parameters may also be indicated in a manner similar to the foregoing manner. Details are not described herein again.

Optionally, the foregoing embodiment is described by using an example in which the first index has 14 or 16 values. It may be understood that, in actual application, the first index may further have more possible values, and each value may also indicate one or more of the foregoing parameters. This is not limited to these embodiments of this application. For example, as shown in Table 17, the first index may have 32 possible values, and the values may indicate different TBS indexes and different modulation schemes.

TABLE 17

| First MCS index | Modulation scheme | TBS index |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| . | . | . |
| . | . | . |
| . | . | . |
| 24 | 16 QAM | 24 |
| 25 | 16 QAM | 25 |
| 26 | 64 QAM | 26 |
| 27 | 64 QAM | 27 |
| 28 | 128 QAM | 28 |
| 29 | 128 QAM | 29 |
| 30 | 128 QAM | 30 |
| 31 | 256 QAM | 31 |

Optionally, in a possible implementation, the first repetition number determined by the terminal device based on the measured channel quality of the PDCCH and/or the PDSCH is 1. In this case, an index set corresponding to the first quantity 1 of repetitions includes a plurality of indexes. It may be understood that the first repetition number determined by the terminal device based on the measured channel quality of the PDCCH and/or the PDSCH may alternatively be another value. This is not limited to these embodiments of this application.

S402: The terminal device sends the first index and indication information to the network device. Correspondingly, the network device receives the first index and the indication information from the terminal device.

The first index occupies a first field, and the indication information indicates that the first field is occupied by an index corresponding to the first repetition number. The first field can be occupied by the repetition number of the PDCCH or the index corresponding to the first repetition number, and the indication information can indicate that the first field is occupied by the repetition number of the PDCCH or the index corresponding to the first repetition number.

Optionally, the terminal device may send a message including the first index and the indication information to the network device. For example, the terminal device may send a first message to the network device, where the first message includes the first index and the indication information, and the first index occupies the first field included in the first message. Correspondingly, the network device receives the first message from the terminal device.

Alternatively, optionally, the network device may send a first field, of a first message, including the first index to the network device, and send a second message including the indication information to the network device. In this case, preferably, the terminal device sends the second message, and then sends the first message. Correspondingly, the network device receives the first message and the second message.

Optionally, the first message may be an Msg 3 in a random access process. The first field may be a field used to send the repetition number of the PDCCH in a conventional technology. That is, the first field may be four bits or two bits, in the Msg 3, used to report the repetition number of the PDCCH.

Optionally, in this case, different Msgs 3 indicate different lengths of the first field. When the Msg 3 is an RRC connection resume request, an RRC connection request, or a user plane RRC connection reestablishment request, existing four bits in the Msg 3 are used to report the repetition number of the PDCCH. In this case, the first field is the four bits. When the Msg 3 is a control plane RRC connection reestablishment request, existing two bits in the Msg 3 are used to report the repetition number of the PDCCH. In this case, the first field is the two bits.

Optionally, when the terminal device includes the first index and the indication information in the first message, and the first message is the Msg 3, the indication information may be carried in one idle bit in the Msg 3. When a value of the bit is 1, the indication information indicates that the first field in the Msg 3 is occupied by the index corresponding to the first repetition number; when the value of the bit is 0, the indication information indicates that the first field in the Msg 3 is occupied by the repetition number of the PDCCH. Alternatively, when a value of the bit is 0, the indication information indicates that the first field in the Msg 3 is occupied by the index corresponding to the first repetition number; when the value of the bit is 1, the indication information indicates that the first field in the Msg 3 is occupied by the repetition number of the PDCCH.

Optionally, when the terminal device includes the first index in the first message, and includes the indication information in the second message, the indication information may be a sequence, and the terminal device may perform indication by using two different sequences. For example, a sequence 1 may indicate that the first field is occupied by the index corresponding to the first repetition number, and a sequence 2 indicates that the first field is occupied by the repetition number of the PDCCH. Alternatively, a sequence 2 may indicate that the first field is occupied by the index corresponding to the first repetition number, and a sequence 1 indicates that the first field is occupied by the repetition number of the PDCCH.

Figure 5:
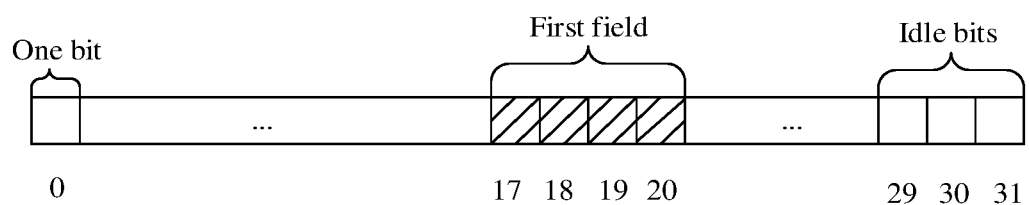
FIG. 5 is a first schematic diagram in which a first index occupies a first field according to an embodiment of this application.
Figure 6:
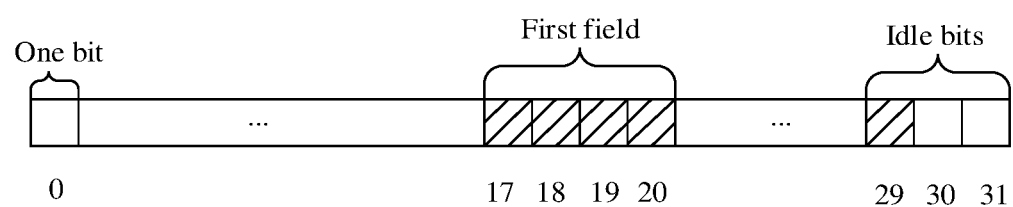
FIG. 6 is a second schematic diagram in which a first index occupies a first field according to an embodiment of this application.

Optionally, that the first index occupies the first field may be understood as that the entire first field is occupied by the first index. For example, the first field is the existing four bits, in the Msg 3, used to report the repetition number of the PDCCH, and the Msg 3 includes 32 bits, where four bits numbered 17 to 20 are used to report the repetition number of the PDCCH. That is, the first field includes the four bits numbered 17 to 20. If the first index determined by the terminal device is four bits, as shown in FIG. 5, the four bits of the first index may occupy all the four bits numbered 17 to 20. Alternatively, for example, if the first index determined by the terminal device is five bits, as shown in FIG. 6, first four bits or last four bits in the five bits may occupy all the four bits numbered 17 to 20, and the remaining one bit in the five bits may occupy the 1s t idle bit (a bit numbered 29) in the Msg 3. If the Msg 3 carries the indication information, an idle bit occupied by the indication information may be located in the 1s t idle bit (a bit numbered 30) after the idle bit occupied by the remaining one bit. Alternatively, the terminal device may report the remaining one bit in the five bits by using a message other than the Msg 3. This is not limited to these embodiments of this application.

Figure 7:
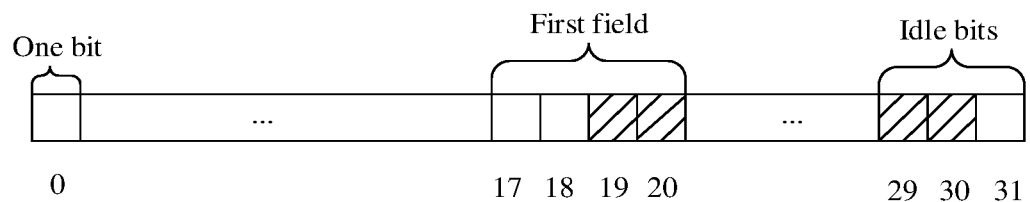
FIG. 7 is a third schematic diagram in which a first index occupies a first field according to an embodiment of this application.
Figure 8:
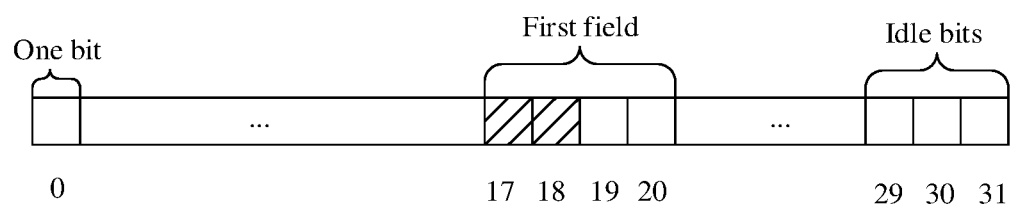
FIG. 8 is a fourth schematic diagram in which a first index occupies a first field according to an embodiment of this application.

Alternatively, that the first index occupies the first field may be understood as that some bits of the first field are occupied by the first index. For example, the first field is the existing four bits, in the Msg 3, used to report the repetition number of the PDCCH, and the Msg 3 includes 32 bits, where four bits numbered 17 to 20 are used to report the repetition number of the PDCCH. That is, the first field includes the four bits numbered 17 to 20. If the first index determined by the terminal device is four bits, as shown in FIG. 7, first two bits or last two bits in the four bits may occupy two consecutive bits in the four bits numbered 17 to 20 in the Msg 3, for example, two bits numbered 19 and 20, and the remaining two bits in the four bits may occupy first two idle bits (two bits numbered 29 and 30) in the Msg 3. If the Msg 3 carries the indication information, an idle bit occupied by the indication information may be located in the P t idle bit (a bit numbered 31) after the idle bits occupied by the remaining two bits. Alternatively, the terminal device may report the remaining two bits in the four bits by using a message other than the Msg 3. Alternatively, for example, if the first index determined by the terminal device is two bits (for example, the first index determined in the manner 2 in step S401), as shown in FIG. 8, the two bits may occupy two consecutive bits in four bits numbered 17 to 20 in the Msg 3, for example, two bits numbered 17 and 18.

It should be noted that, when the first field is the existing two bits, in the Msg 3, used to report the repetition number of the PDCCH, a case in which the first index occupies the first field is similar to that when the first field is the existing four bits, in the Msg 3, used to report the repetition number of the PDCCH. For related descriptions, refer to the foregoing embodiment. Details are not described herein again.

It should be noted that the first field occupied by the first index in the foregoing embodiment is the bits used to report the repetition number of the PDCCH in the conventional technology. In this case, the terminal device may report only an index corresponding to the repetition number of the PDCCH and/or the PDSCH, but does not report the repetition number of the PDCCH. It may be understood that the first field may alternatively be another field. In other words, when sending the first index, the terminal device does not reuse the bits used to report the repetition number of the PDCCH in the conventional technology. In other words, the terminal device reports both the repetition number of the PDCCH and the index corresponding to the repetition number of the PDCCH and/or the PDSCH. In this case, the first message may alternatively be a message other than the Msg 3. That is, the first field may be a field in a message other than the Msg 3.

S403: The network device determines, based on the indication information, that the first field is occupied by the index corresponding to the first repetition number, and determines that the index corresponding to the first repetition number is the first index.

Optionally, when the terminal device includes the first index in the first message, and includes the indication information in the first message or the second message, after receiving and decoding the first message, the network device does not determine whether the first field in the first message is occupied by the repetition number of the PDCCH or the index corresponding to the first repetition number. Therefore, the network device may determine, based on the indication information, whether the first field is occupied by the repetition number of the PDCCH or the index corresponding to the first repetition number. When determining, based on the indication information, that the first field is occupied by the index corresponding to the first repetition number, the network device may further determine that the index that corresponds to the first repetition number and that occupies the first field is the first index.

Optionally, after determining the first index, the network device may determine a scheduling policy of a downlink data block based on the first index.

According to the channel quality reporting method provided to these embodiments of this application, because the terminal device reports the first index in the index set corresponding to the first repetition number, the channel quality can be fed back more accurately than when the terminal device reports the first repetition number, so that the network device can more properly determine a scheduling policy of a downlink transport block. In addition, because the first index occupies the first field that can be occupied by the repetition number of the PDCCH, the first field occupied by the repetition number of the PDCCH can be reused, to improve resource utilization. Further, because the indication information can indicate that the first field is occupied by the repetition number of the PDCCH or the index corresponding to the first repetition number, backward compatibility is ensured, so that the network device understands, based on the indication information, content carried in the first field, and the network device does not misunderstand the first field.

The processor 201 in the network device 20 shown in FIG. 2 may invoke application program code stored in the memory 202, to indicate the network device to perform actions performed by the network device in steps S401 to S403. The processor 301 in the terminal device 30 shown in FIG. 2 may invoke application program code stored in the memory 302, to indicate the terminal device to perform actions performed by the terminal device in steps S401 to S403. This is not limited to these embodiments.

Figure 9:
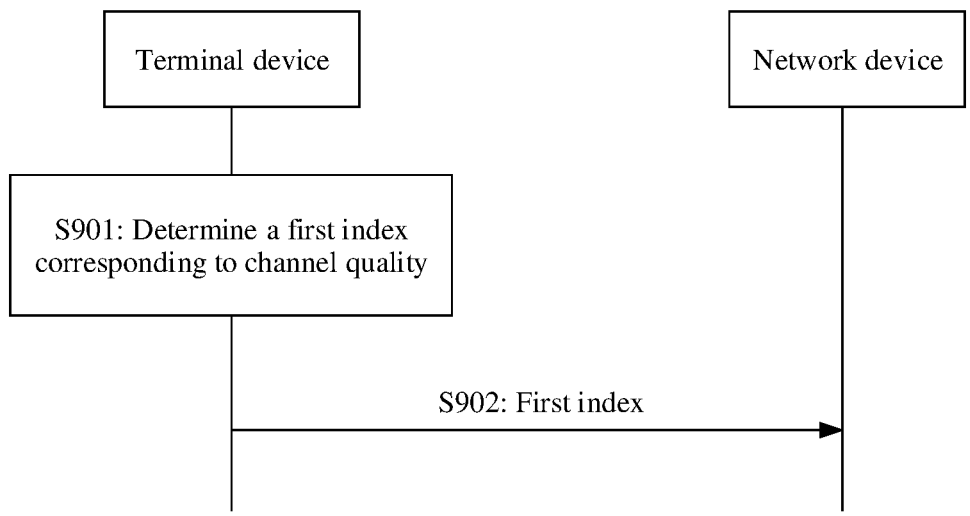
FIG. 9 is a second schematic flowchart of a channel quality reporting method according to an embodiment of this application.

In another possible implementation, as shown in FIG. 9, when a repetition number of DCI or a repetition number of a RAR is a second repetition number, where the repetition number of the DCI or the repetition number of the RAR is indicated in the DCI used to schedule the RAR, or a repetition number, of an Msg 3, indicated in the RAR is the second repetition number (where the second repetition number may be the same as or different from the first repetition number), another channel quality reporting method according to an embodiment of this application includes the following steps.

S901: A terminal device determines a first index corresponding to channel quality.

The first index is an index in an index set corresponding to a case in which a repetition number of a PDCCH and/or a PDSCH is a first repetition number. The first index can more accurately reflect channel quality of the PDCCH and/or the PDSCH measured by the terminal device. It may also be understood that the first index can more accurately reflect a data demodulation capability of the terminal device under the measured channel quality. For other related descriptions, refer to step S401. Details are not described herein again.

S902: The terminal device sends the first index to a network device. Correspondingly, the network device receives the first index from the terminal device.

The first index occupies a first field, and the first field can be occupied by the repetition number of the PDCCH or an index corresponding to the first repetition number.

Because the network device sends, to the terminal device, DCI used to schedule an RAR, and sends the RAR to the terminal device, the network device may determine a repetition number of the DCI, a repetition number of the RAR, or a repetition number, of a Msg 3, indicated in the RAR, where the repetition number of the DCI or the repetition number of the RAR is indicated in the DCI used to schedule the RAR. Therefore, when determining that the repetition number of the DCI, the repetition number of the RAR, or the repetition number of the Msg 3 is a second repetition number, the network device may default that the first field is occupied by the index corresponding to the first repetition number. In this way, the terminal device does not need to send indication information to indicate, to the network device, that the first field is occupied by the index corresponding to the first repetition number.

Optionally, the terminal device may send a first message including the first index to the network device, where the first index occupies the first field included in the first message. Correspondingly, the network device receives the first message from the terminal device.

Optionally, the first message may be an Msg 3 in a random access process. The first field may be a field used to send the repetition number of the PDCCH in a conventional technology. That is, the first field may be four bits or two bits, in the Msg 3, used to report the repetition number of the PDCCH.

Optionally, in this case, different Msgs 3 indicate different lengths of the first field. For related descriptions, refer to step S402. Details are not described herein again. It should be noted that, to these embodiments, the Msg 3 may alternatively be an RRC early data request. In this case, in the Msg 3, existing four bits are also used to report the repetition number of the PDCCH, that is, a length of the first field is four bits.

Optionally, that the first index occupies the first field may be understood as that the entire first field is occupied by the first index, or may be understood as that some bits of the first field are occupied by the first index. For related descriptions, refer to step S402. Details are not described herein again.

It should be noted that the first field occupied by the first index in the foregoing embodiment is the bits used to report the repetition number of the PDCCH in the conventional technology. In this case, the terminal device may report only an index corresponding to the repetition number of the PDCCH and/or the PDSCH, but does not report the repetition number of the PDCCH. It may be understood that the first field may alternatively be another field. In other words, when sending the first index, the terminal device does not reuse the bits used to report the repetition number of the PDCCH in the conventional technology. In other words, the terminal device reports both the repetition number of the PDCCH and the index corresponding to the repetition number of the PDCCH and/or the PDSCH. In this case, the first message may alternatively be a message other than the Msg 3. That is, the first field may be a field in a message other than the Msg 3.

According to the channel quality reporting method provided to these embodiments of this application, because the terminal device reports the first index in the index set corresponding to the first repetition number, the channel quality can be fed back more accurately than when the terminal device reports the first repetition number, so that the network device can more properly determine a scheduling policy of a downlink transport block. In addition, because the first index occupies the first field that can be occupied by the repetition number of the PDCCH, the first field occupied by the repetition number of the PDCCH can be reused, to improve resource utilization. Further, because the terminal device and the network device transmit the index corresponding to the first repetition number when the repetition number of the DCI, the repetition number of the RAR, or the repetition number of the Msg 3 is the second repetition number, where the repetition number of the DCI or the repetition number of the RAR is indicated by the DCI used to schedule the RAR, backward compatibility is ensured, so that the network device understands, based on the repetition number of the DCI, the repetition number of the RAR, or the repetition number of the Msg 3, content carried in the first field, and the network device does not misunderstand the first field. In addition, because the indication information does not need to be transmitted, resource utilization can be further improved.

The processor 201 in the network device 20 shown in FIG. 2 may invoke application program code stored in the memory 202, to indicate the network device to perform actions performed by the network device in steps S901 and S902. The processor 301 in the terminal device 30 shown in FIG. 2 may invoke application program code stored in the memory 302, to indicate the terminal device to perform actions performed by the terminal device in steps S901 and S902. This is not limited to these embodiments.

It may be understood that, in the foregoing embodiments, methods and/or steps implemented by the terminal device may alternatively be implemented by a component (for example, a chip or a circuit) that can be used in the terminal device, and methods and/or steps implemented by the network device may alternatively be implemented by a component that can be used in the network device.

The foregoing mainly describes the solutions provided in the embodiments of this application from a perspective of interaction between network elements. Correspondingly, an embodiment of this application further provides a communication apparatus, and the communication apparatus is configured to implement the foregoing methods. The communication apparatus may be the terminal device in the foregoing method embodiments, an apparatus including the terminal device, or a component that can be used in the terminal device. Alternatively, the communication apparatus may be the network device in the foregoing method embodiments, an apparatus including the network device, or a component that can be used in the network device. It may be understood that, to implement the foregoing functions, the communication apparatus includes a corresponding hardware structure and/or software module for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example, and is merely logical function division. During actual implementation, another division manner may be used.

Figure 10:
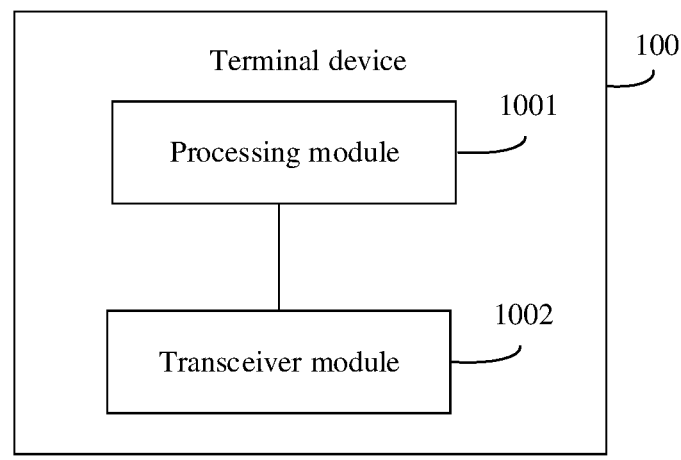
FIG. 10 is a schematic diagram of another structure of a terminal device according to an embodiment of this application.

For example, the communication apparatus is the terminal device in the foregoing method embodiments. FIG. 10 is a schematic diagram of a structure of a terminal device 100. The terminal device 100 includes a processing module 1001 and a transceiver module 1002. The transceiver module 1002 may also be referred to as a transceiver unit, configured to implement a sending and/or receiving function. For example, the transceiver module 1002 may be a transceiver circuit, a transceiver, or a communication interface.

The processing module 1001 is configured to determine a first index corresponding to channel quality, where the first index is an index in an index set corresponding to a case in which a repetition number of a physical downlink control channel and/or a physical downlink data channel is a first repetition number. The transceiver module 1002 is configured to send the first index and indication information to a network device, where the first index occupies a first field, the indication information indicates that the first field is occupied by an index corresponding to the first repetition number, the first field can be occupied by the repetition number of the physical downlink control channel or the index corresponding to the first repetition number, and the indication information can indicate that the first field is occupied by the repetition number of the physical downlink control channel or the index corresponding to the first repetition number.

Optionally, if the first index is a first MCS index, that the processing module 1001 is configured to determine a first index corresponding to channel quality includes: The processing module 1001 is configured to determine, based on the channel quality, a preset rule, and a reference MCS index, the first MCS index corresponding to the channel quality.

Optionally, that the transceiver module 1002 is configured to send the first index and indication information to a network device includes: The transceiver module 1002 is configured to send a first message to the network device, where the first message includes the first index and the indication information, and the first index occupies the first field included in the first message.

All related content of the steps in the foregoing method embodiments may be cited in function descriptions of a corresponding functional module. Details are not described herein again.

In these embodiments, the terminal device 100 is presented in a form of functional modules obtained through division in an integrated manner. The "module" herein may be an application-specific integrated circuit (ASIC), a circuit, a processor executing one or more software or firmware programs, a memory, an integrated logic circuit, and/or another device that can provide the foregoing function. In a simple embodiment, a person skilled in the art may figure out that the terminal device 100 may be in a form of the terminal device 30 shown in FIG. 2.

For example, the processor 301 in the terminal device 30 in FIG. 2 may invoke the computer-executable instructions stored in the memory 302, so that the terminal device 30 performs the channel quality reporting method in the foregoing method embodiments.

The processor 301 in the terminal device 30 shown in FIG. 2 may invoke the computer-executable instructions stored in the memory 302, to implement functions/implementation processes of the processing module 1001 and the transceiver module 1002 in FIG. 10. Alternatively, the processor 301 in the terminal device 30 shown in FIG. 2 may invoke the computer-executable instructions stored in the memory 302, to implement functions/implementation processes of the processing module 1001 in FIG. 10, and the transceiver 303 in the terminal device 30 shown in FIG. 2 may implement functions/implementation processes of the transceiver module 1002 in FIG. 10.

The terminal device 100 provided in these embodiments can perform the channel quality reporting method. Therefore, for technical effects that can be achieved by the terminal device 100, refer to the foregoing method embodiments. Details are not described herein again.

Figure 11:
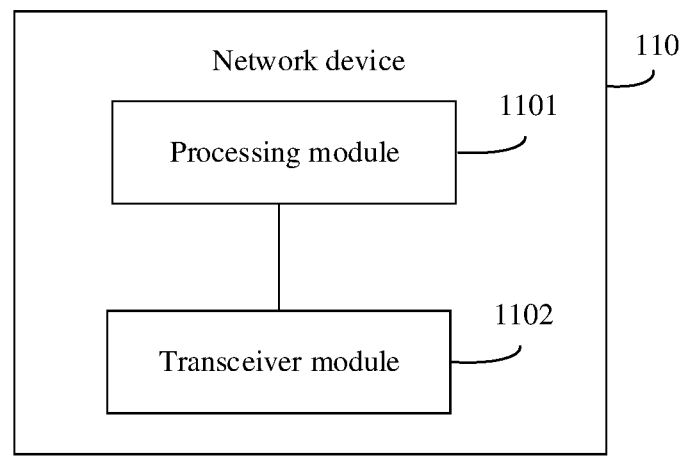
FIG. 11 is a schematic diagram of another structure of a network device according to an embodiment of this application.

Alternatively, for example, the communication apparatus is the network device in the foregoing method embodiments. FIG. 11 is a schematic diagram of a structure of a network device 110. The network device 110 includes a processing module 1101 and a transceiver module 1102. The transceiver module 1102 may also be referred to as a transceiver unit, configured to implement a sending and/or receiving function. For example, the transceiver module 1102 may be a transceiver circuit, a transceiver, or a communication interface.

The transceiver module 1102 is configured to receive a first index and indication information from a terminal device, where the first index is an index in an index set corresponding to a case in which a repetition number of a physical downlink control channel and/or a physical downlink data channel is a first repetition number. The processing module 1101 is configured to determine, based on the indication information, that a first field is occupied by an index corresponding to the first repetition number, and the processing module 1101 is configured to determine that the index corresponding to the first repetition number is the first index, where the first field can be occupied by the repetition number of the physical downlink control channel or the index corresponding to the first repetition number, and the indication information can indicate that the first field is occupied by the repetition number of the physical downlink control channel or the index corresponding to the first repetition number.

Optionally, that the transceiver module 1102 is configured to receive a first index and indication information from a terminal device includes: The transceiver module 1102 is configured to receive a first message from the terminal device, where the first message includes the first index and the indication information, and the first index occupies the first field included in the first message.

All related content of the steps in the foregoing method embodiments may be cited in function descriptions of a corresponding functional module. Details are not described herein again.

In these embodiments, the network device 110 is presented in a form of functional modules obtained through division in an integrated manner. The "module" herein may be an application-specific integrated circuit (ASIC), a circuit, a processor executing one or more software or firmware programs, a memory, an integrated logic circuit, and/or another device that can provide the foregoing function. In a simple embodiment, a person skilled in the art may figure out that the network device 110 may be in a form of the network device 20 shown in FIG. 2.

For example, the processor 201 in the network device 20 in FIG. 2 may invoke the computer-executable instructions stored in the memory 202, so that the network device 20 performs the channel quality reporting method in the foregoing method embodiments.

The processor 201 in the network device 20 shown in FIG. 2 may invoke the computer-executable instructions stored in the memory 202, to implement functions/implementation processes of the processing module 1101 and the transceiver module 1102 in FIG. 11. Alternatively, the processor 201 in the network device 20 shown in FIG. 2 may invoke the computer-executable instructions stored in the memory 202, to implement functions/implementation processes of the processing module 1101 in FIG. 11, and the transceiver 203 in the network device 20 shown in FIG. 2 may implement functions/implementation processes of the transceiver module 1102 in FIG. 11.

The network device 110 provided in these embodiments can perform the channel quality reporting method. Therefore, for technical effects that can be achieved by the network device 110, refer to the foregoing method embodiments. Details are not described herein again.

Optionally, embodiments of this application further provide a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to indicate the communication apparatus to perform the method in any one of the foregoing method embodiments. Certainly, the memory may not be in the communication apparatus. When the communication apparatus is a chip system, the chip system may include a chip, or may include a chip and another discrete device. This is not limited to these embodiments of this application.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments of this application, the computer may include the foregoing apparatus.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the term "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to this application without departing from the spirit and scope of this application. Correspondingly, the specification and the accompanying drawings are merely example descriptions in this application defined by the appended claims, and are intended to cover any of or all modifications, variations, combinations, or equivalents within the scope of this application. It is clear that a person skilled in the art can make various modifications and variations to this application without departing from the spirit and scope of this application. In this way, if these modifications and variations to this application fall within the scope of the claims of this application and their equivalent technologies, this application is also intended to cover these modifications and variations.

What is claimed is:

1. A channel quality reporting method, wherein the method comprises:
   determining a first index corresponding to channel quality, wherein the first index is an index in an index set, the index set includes a first index set and a second index set, the first index set includes a repetition number of a physical downlink control channel, and the second index set is an index set corresponding to a case in which a repetition number of a physical downlink control channel is a first repetition number; and
   sending the first index and indication information to a network device, wherein the first index occupies a first field, and the indication information indicates that the first field is occupied by an index in the first index set or the second index set.

2. The method according to claim 1, wherein the first index is an index of the second index set, and the second index set includes at least one of the following: a transport block size carried on the physical downlink data channel, an index of the transport block size carried on the physical downlink data channel, a modulation scheme of the data block carried on the physical downlink data channel, an index of the modulation scheme of the data block carried on the physical downlink data channel, an aggregation level of the physical downlink control channel, or an index of the aggregation level of the physical downlink control channel.

3. The method according to claim 1, wherein the first index is a first modulation and coding scheme (MCS) index, a first channel quality indication (CQI) index, a reported value corresponding to the first MCS index, or a reported value corresponding to the first CQI index.

4. The method according to claim 1, wherein the sending the first index and the indication information to the network device comprises sending a first message to the network device, wherein the first message comprises the first index and the indication information, and the first index occupies the first field comprised in the first message.

5. The method according to claim 1, wherein the first repetition number is 1, and the index set comprises a plurality of indexes.

6. A channel quality reporting method, wherein the method comprises:
   receiving a first index and indication information from a terminal device, wherein the first index is an index in an index set, the index set includes a first index set and a second index set, the first index set includes a repetition number of a physical downlink control channel, and the second index set is an index set corresponding to a case in which a repetition number of a physical downlink control channel is a first repetition number; and
   determining, based on the indication information, that a first field is occupied by the first index.

7. The method according to claim 6, wherein the first index is an index of the second index set, and the second index set includes at least one of the following: a transport block size carried on the physical downlink data channel, an index of the transport block size carried on the physical downlink data channel, a modulation scheme of the data block carried on the physical downlink data channel, an index of the modulation scheme of the data block carried on the physical downlink data channel, an aggregation level of the physical downlink control channel, or an index of the aggregation level of the physical downlink control channel.

8. The method according to claim 6, wherein the first index is a first modulation and coding scheme (MCS) index, a first channel quality indication (CQI) index, a reported value corresponding to the first MCS index, or a reported value corresponding to the first CQI index.

9. The method according to claim 6, wherein the receiving the first index and the indication information from the terminal device comprises receiving a first message from the terminal device, wherein the first message comprises the first index and the indication information, and the first index occupies the first field comprised in the first message.

10. The method according to claim 6, wherein the first repetition number is 1, and the index set comprises a plurality of indexes.

11. A communication apparatus, wherein the communication apparatus comprises:
at least one processor; and
one or more memories coupled to the at least one processor and storing programming instructions for execution by the at least one processor to:
determine a first index corresponding to channel quality, wherein the first index is an index in an index set, the index set includes a first index set and a second index set, the first index set includes a repetition number of a physical downlink control channel, and the second index set is an index set corresponding to a case in which a repetition number of a physical downlink control channel is a first repetition number; and
send the first index and indication information to a network device, wherein the first index occupies a first field, and the indication information indicates that the first field is occupied by an index in the first index set or the second index set.

12. The communication apparatus according to claim 11, wherein the first index is an index of the second index set, and the second index set includes at least one of one of the following: a transport block size carried on the physical downlink data channel, an index of the transport block size carried on the physical downlink data channel, a modulation scheme of the data block carried on the physical downlink data channel, an index of the modulation scheme of the data block carried on the physical downlink data channel, an aggregation level of the physical downlink control channel, or an index of the aggregation level of the physical downlink control channel.

13. The communication apparatus according to claim 11, wherein the first index is a first modulation and coding scheme (MCS) index, a first channel quality indication (CQI) index, a reported value corresponding to the first MCS index, or a reported value corresponding to the first CQI index.

14. The communication apparatus according to claim 11, wherein the one or more memories store the programming instructions for execution by the at least one processor to send a first message to the network device, wherein the first message comprises the first index and the indication information, and the first index occupies the first field comprised in the first message.

15. The communication apparatus according to claim 11, wherein the first repetition number is 1, and the index set comprises a plurality of indexes.

16. A communication apparatus, wherein the apparatus comprises:
at least one processor; and
one or more memories coupled to the at least one processor and storing programming instructions for execution by the at least one processor to:
receive a first index and indication information, wherein the first index is an index in an index set, the index set includes a first index set and a second index set, the first index set includes a repetition number of physical downlink control channel, and the second index set is an index set corresponding to a case in which a repetition number of a physical downlink control channel is a first repetition number; and
determine, based on the indication information, that a first field is occupied by the first index, and the indication information indicates that the first field is occupied by an index in the first index set or the second index set.

17. The communication apparatus according to claim 16, wherein the first index is an index of the second index set, and the second index set includes at least one of one of the following: a transport block size carried on the physical downlink data channel, an index of the transport block size carried on the physical downlink data channel, a modulation scheme of the data block carried on the physical downlink data channel, an index of the modulation scheme of the data block carried on the physical downlink data channel, an aggregation level of the physical downlink control channel, or an index of the aggregation level of the physical downlink control channel.

18. The communication apparatus according to claim 16, wherein the first index is a first modulation and coding scheme (MCS) index, a first channel quality indication (CQI) index, a reported value corresponding to the first MCS index, or a reported value corresponding to the first CQI index.

19. The communication apparatus according to claim 16, wherein the one or more memories store the programming instructions for execution by the at least one processor to receive a first message, wherein the first message comprises the first index and the indication information, and the first index occupies the first field comprised in the first message.

20. The communication apparatus according to claim 16, wherein the first repetition number is 1, and the index set comprises a plurality of indexes.

* * * * *

UNITED STATES PATENT AND TRADEMARK OFFICE
CERTIFICATE OF CORRECTION

| | |
|---|---|
| PATENT NO. | : 12,035,348 B2 |
| APPLICATION NO. | : 17/576602 |
| DATED | : July 9, 2024 |
| INVENTOR(S) | : Yuwan Su et al. |

It is certified that error appears in the above-identified patent and that said Letters Patent is hereby corrected as shown below:

In the Claims

In Column 32, Line 24, in Claim 17, after "least" delete "one of".

Signed and Sealed this
Third Day of September, 2024

Katherine Kelly Vidal
Director of the United States Patent and Trademark Office